July 11, 1933. H. K. CHRIST 1,918,017
COMBINED FLOOR JACK AND CLAMP
Filed May 22, 1930
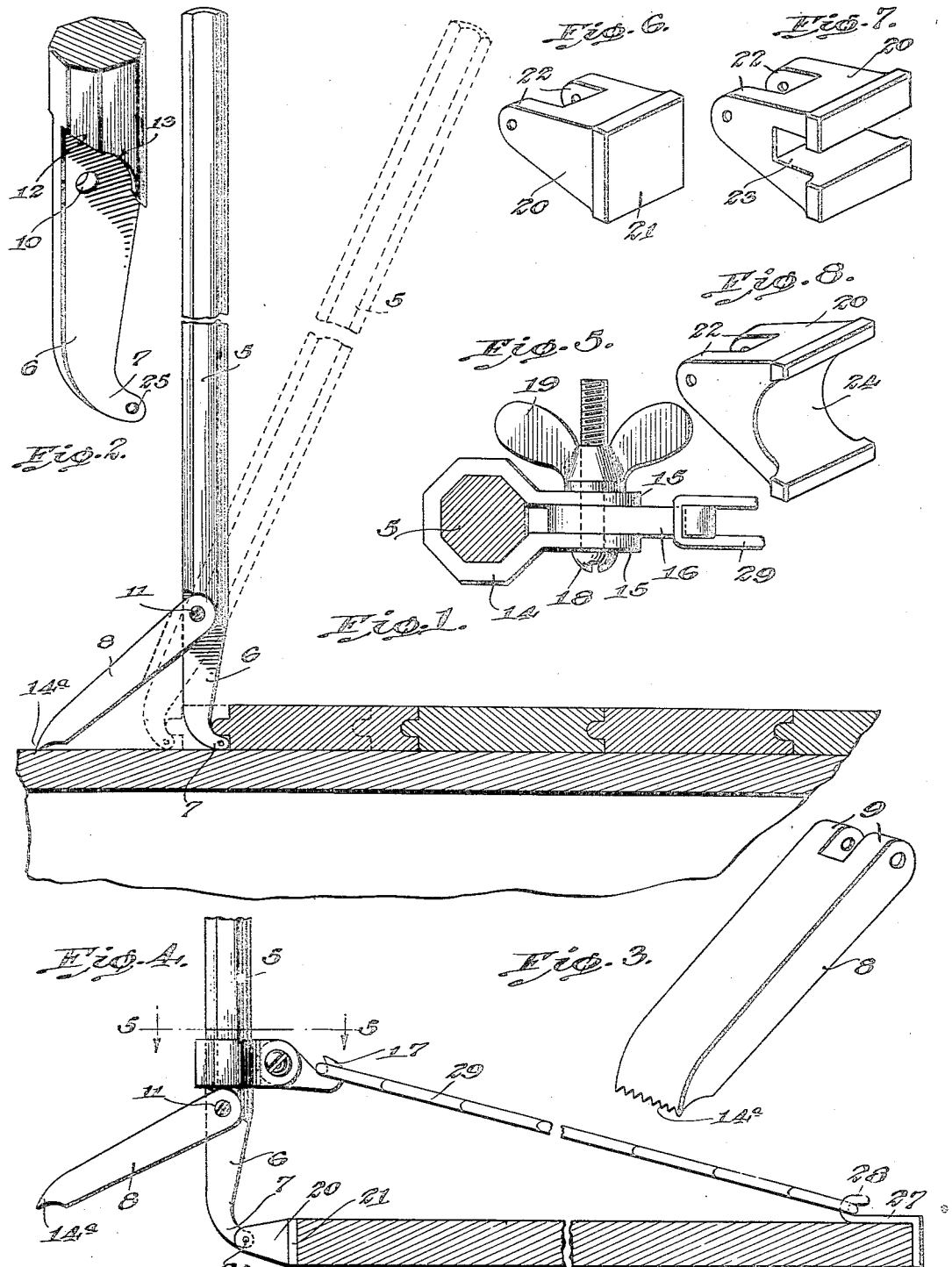
WITNESS
INVENTOR
H. K. Christ,
BY
ATTORNEY Patented July 11, 1933

1,918,017

UNITED STATES PATENT OFFICE

HENRY K. CHRIST, OF ALLENTOWN, PENNSYLVANIA

COMBINED FLOOR JACK AND CLAMP

Application filed May 22, 1930. Serial No. 454,762.

My invention relates to floor jacks and an object of the same is to provide a device which may be used either as a floor jack or as a clamp for holding a number of boards in place until they are permanently secured.

A further object of the invention is to provide a device of this character which embodies a plurality of interchangeable bearing members so that the device may be used regardless of the shape of the edge of the board.

With the preceding and other objects and advantages in mind, the invention consists in the novel combination of elements, constructions and arrangements of parts and operations to be hereinafter more fully described, claimed and illustrated in the accompanying drawing, wherein:

Figure 1 is a side elevation of my device in use, the dotted lines indicating the position of the device prior to the jacking operation;

Fig. 2 is an enlarged detail perspective view of the invention;

Fig. 3 is a perspective of the dog or joist engaging member;

Fig. 4 is a modification of the invention;

Fig. 5 is a horizontal section taken on line 5—5 of Fig. 4;

And Figs. 6, 7 and 8 are perspectives of the bearing heads for use with the device disclosed in Fig. 4.

Referring to the invention in detail a lever of octagon in cross section shape is provided. The lower end of the lever is cut away to provide a flat shank 6 which terminates in a laterally curved bearing member 7 which is adapted to engage the flooring as disclosed in Fig. 1.

A dog or rafter engaging member 8 is provided and is formed with parallel perforated ears 9 at one end which straddle the shank adjacent its upper end and register with a transverse opening 10 therein. A pivot 11 extends through the ears and opening 10 to pivotally connect the dog and shank. At the juncture of the shank 6 and lever 5 lateral shoulders 12 are formed and are rounded as at 13 to permit pivotal movement of the ears 9.

In use the lever is arranged in the dotted line position disclosed in Fig. 1 with the curved end 7 of the shank 6 engaged with the flooring and the dog 8 engaged with one of the beams or rafters. Movement of the lever to the upright position rocks the shank 6 about the axis 11 and thereby forces the flooring into place. To prevent slipping the lower end of the dog 8 is provided with teeth or serrations 14a which bite into the wood. In the embodiment of the invention disclosed in Figs. 4 to 8 inclusive an octagonal-shaped clamp 14 is received on the lower end of the lever slightly above the pivoted end of the dog 8. The clamp is provided with parallel arms 15 between which a flat shank 16 is arranged and which projects laterally therefrom and terminates in an upstanding hook 17. A screw 18 passes transversely through the arms and shank 16 and is provided with a wing nut 19 for holding the arms in clamped engagement with the shank.

Any one of the bearing members disclosed in Figs. 6, 7, and 8 is adapted to be attached to the part 7 of the shank 6. The bearing member disclosed in Fig. 6 consists of a body 20 having a flat head 21 at one end and a pair of perforated ears 22 at its opposite end. In Fig. 7 the body is provided with a transverse groove which accommodates the tongue when the device is used in conection with boards having tongue and groove connections. With the tongue of the board received in the groove pressure will be exerted upon the board at opposite sides of the tongue so that mutilation of the latter is prevented.

In Fig. 8 the body is provided with a concave surface 24 for accommodating the convex edge of a board. When using anyone of the bearing members the ears 22 are disposed upon opposite sides of the terminal of the part 7 in registration with an opening 25 therein and a removable pivot pin 26 is engaged with the parts. As disclosed in Fig. 4 the bearing member is engaged with the outer edge of a board and an angle plate 27 is engaged with the outer edge of a second board arranged parallel to the first mentioned board. The angle plate is provided with a hook element 28 upon its inner end. A chain or other flexible element 29 is engaged with the hook elements 17 and 28 to connect the angle plate 27 with the lever 5. It will be seen that upon moving the lever to the left the two boards will be drawn tightly together and held in this position until they are nailed or otherwise secured in place.

What is claimed is:

1. In a device of the character described, a lever, a head connected with the lower end of the lever for engagement with one side of a board, a dog pivotally connected with the lever a short distance from one end thereof and engageable with an object to hold the lever in operative position, a clamp attached to the lever adjacent its lower end and above the pivotal connection of said dog, and angle plate, and a flexible element engaged with the said clamp and said angle plate.

2. A lever of which one end is adapted to exert pressure on one side of an object to be clamped, a dog directed away from said object, said dog being mounted on the lever and being engageable with a fixed abutment, a connection carried by the lever and extending therefrom in the direction opposite to that of the dog, and an angle plate attached to said connection and engaging the opposite side of said object, a turn of the lever toward the dog causing compression of the object from both sides.

3. A lever of which one end is adapted to exert pressure on one side of an object to be clamped, a dog directed away from said object, said dog being mounted on the lever and being engageable with a fixed abutment, a connection carried by the lever and extending therefrom in the direction opposite to that of the dog, an angle plate attached to said connection and engaging the opposite side of said object, a turn of the lever toward the dog causing compression of the object from both sides, and a head with means on which said one end of the lever can turn, said head being engageable with said one side of the object.

4. A lever, a dog movably connected with the lever and extending therefrom in one direction, a connection adapted to extend from the lever in the opposite direction, and gripping means carried by one end of said connection, and a clamp slipped on the lever having means for fixedly attached it to the lever and having means for the attachment of the other end of said connection.

HENRY K. CHRIST.